US008516115B2

(12) United States Patent
Westman

(10) Patent No.: US 8,516,115 B2
(45) Date of Patent: Aug. 20, 2013

(54) PASSING INFORMATION TO AND FROM AN APPLICATION SERVER IN A COMMUNICATION SYSTEM

(75) Inventor: Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 890 days.

(21) Appl. No.: 10/473,300

(22) PCT Filed: Apr. 2, 2002

(86) PCT No.: PCT/IB02/02564
§ 371 (c)(1),
(2), (4) Date: Nov. 19, 2003

(87) PCT Pub. No.: WO02/087265
PCT Pub. Date: Oct. 31, 2002

(65) Prior Publication Data
US 2004/0088419 A1 May 6, 2004

(30) Foreign Application Priority Data

Mar. 30, 2001 (GB) .................................. 0108041.5
Jan. 14, 2002 (GB) .................................. 0200714.4

(51) Int. Cl.
*G06F 15/173* (2006.01)
*G06F 15/16* (2006.01)

(52) U.S. Cl.
USPC ............ 709/225; 709/223; 709/227; 709/228

(58) Field of Classification Search
USPC ................. 709/220, 222, 223, 225, 227–229, 709/230, 232, 237
See application file for complete search history.

(56) References Cited

U.S. PATENT DOCUMENTS

| 5,805,804 | A  | * | 9/1998  | Laursen et al. ............... 709/223 |
| 5,812,670 | A  | * | 9/1998  | Micali .............................. 705/74 |
| 5,901,352 | A  |   | 5/1999  | St-Pierre et al. |
| 6,327,267 | B1 | * | 12/2001 | Valentine et al. ............. 370/466 |
| 6,330,610 | B1 | * | 12/2001 | Docter et al. .................. 709/229 |
| 6,603,969 | B1 | * | 8/2003  | Vuoristo et al. ............... 455/433 |
| 6,615,236 | B2 | * | 9/2003  | Donovan et al. .............. 709/203 |
| 6,662,014 | B1 | * | 12/2003 | Walsh ......................... 455/456.2 |
| 7,007,080 | B2 | * | 2/2006  | Wilson .......................... 709/221 |
| 7,054,648 | B2 | * | 5/2006  | Abtin et al. ................. 455/456.2 |
| 7,093,286 | B1 | * | 8/2006  | King ............................... 726/12 |

(Continued)

FOREIGN PATENT DOCUMENTS

| WO | WO 00/02406 | * | 1/2000 |
| WO | WO 00/79756 A2 | | 12/2000 |
| WO | WO 02/19749 A1 | | 3/2002 |
| WO | WO 02/052834 | | 7/2002 |

*Primary Examiner* — Derrick Ferris
*Assistant Examiner* — Scott M Sciacca
(74) *Attorney, Agent, or Firm* — Mintz, Levin, Cohn, Ferris, Glovsky & Popeo, P.C.

(57) ABSTRACT

A method for transferring information in a communication system whereby one or more subscriber units may communicate, the system comprising a network having a connection controller, one or more subscriber information stores and at least one application provider, the method comprising registering a subscriber unit with the network, including transmitting from the subscriber information store associated with that subscriber unit to the connection controller information indicative of the access of that subscriber unit to application services: and in order to enable access to services of the application provider, transmitting from the connection controller to the application provider at least one of: a. an indication of the address of at least one unit from which the application provider may retrieve subscriber specific information related to the services of the application provider; and b. subscriber specific information related to the services of the application provider.

20 Claims, 1 Drawing Sheet

(56) References Cited

U.S. PATENT DOCUMENTS

| | | | |
|---|---|---|---|
| 7,110,773 B1* | 9/2006 | Wallace et al. | 455/456.1 |
| 7,126,939 B2* | 10/2006 | Barany et al. | 370/352 |
| 2001/0031635 A1* | 10/2001 | Bharatia | 455/432 |
| 2002/0026473 A1* | 2/2002 | Gourraud | 709/203 |
| 2002/0035605 A1* | 3/2002 | McDowell et al. | 709/206 |
| 2002/0037723 A1* | 3/2002 | Roach | 455/435 |
| 2002/0119788 A1* | 8/2002 | Parupudi et al. | 455/456 |
| 2002/0120370 A1* | 8/2002 | Parupudi et al. | 701/1 |
| 2002/0147845 A1* | 10/2002 | Sanchez-Herrero et al. | 709/245 |
| 2006/0155871 A1* | 7/2006 | Ilkka et al. | 709/238 |

\* cited by examiner

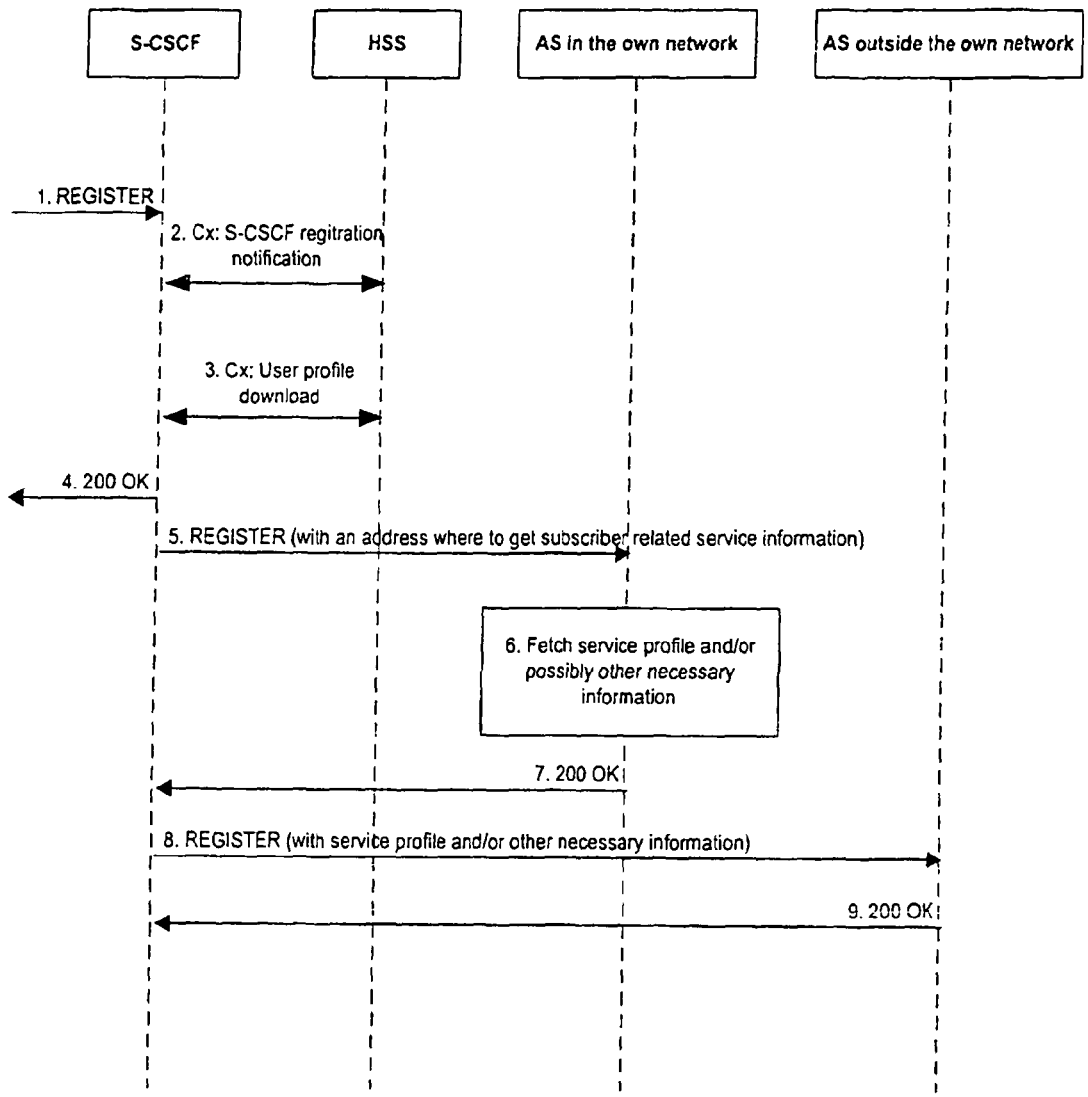

PASSING INFORMATION TO AND FROM AN APPLICATION SERVER IN A COMMUNICATION SYSTEM

CROSS REFERENCE TO RELATED APPLICATIONS

This application is a U.S. National Stage entry, filed under 35 U.S.C. §371, of PCT Application No. PCT/IB02/02564, filed on Apr. 2, 2002, and claims priority to United Kingdom Patent Application No. GB 0108041.5, filed on Mar. 30, 2001, and United Kingdom Patent Application No. GB 0200714.4, filed Jan. 14, 2002, the contents of all three applications are hereby incorporated by reference in their entirety for all purposes.

BRIEF DESCRIPTION OF THE DRAWING

FIG. 1 depicts features consistent with some implementations of the claimed subject matter.

DETAILED DESCRIPTION

This invention relates to a method whereby information could be passed from S-CSCF to an AS, and how it could be done at registration, and generalisations thereof.

When the UE is registered, normally also one or more ASs need to know that the UE is registered. In order to be ready to offer certain services to the subscriber the AS normally needs to know information concerning the subscription associated with the UE. Normally that information is stored in HSS and needs to be fetched from there. For instance, an AS offering forwarding services needs to know whether the subscriber has ordered and paid for the forwarding services as well as the. address(es) where to forward the sessions. Fetching information from HSS is problematic when the AS is a third party AS located in a third party network or the AS is an AS located in the visited network. In both cases a foreign AS should know the address of the HSS and be able to send and receive messages to/from the HSS in order to carry needed information from the HSS. To reveal the address of the HSS ruins partly the configuration hiding of the network. It is also a step towards the visited control model (where the controlling S-CSCF is located in the visited network) that is not supported by current 3rd generation communication standards. An existing hiding technique cannot be used because hiding HSS is not similar as hiding S-CSCFs. If AS registers itself to S-CSCF, the problem is even worse because the foreign AS should know addresses of all the possible S-CSCFs. It would ruin the configuration hiding totally if no hiding is used. Hiding in that case wouldn't be the same as hiding S-CSCFs at registration and during sessions. If SLF is used problem is much worse because the task of SLF is to return the address of HSS that contains the information concerning the subscription. Thus it is easy for a foreign operator to reveal the number of HSSs, and possibly also retrieve subscriber specific information.

Some solutions to this problem are already being proposed. However, these proposals all have their own disadvantages. The current proposals can be divided into two groups:

A. AS has to subscribe in advance to get a notification of registration,

B. AS is notified without any subscription.

Proposals in group A have at least the following problems:
a) Every AS has to know addresses of all the S-CSCFs.

This is a severe problem when the AS is located in a visited or third party network, because it reveals the number of S-CSCFs and ruins the network topology hiding.
b) HSS address and "aggregated" subscriber list is delivered to every AS.

This is also a severe problem when the AS is located in a visited or third party network, because it evidently reveals the number of HSSs and possibly also the number of subscribers.
c) Solutions overlap with the "address list concept" in the REGISTER method case.

According to certain requirements there is a list of ASs that has to be contacted at the registration.

Proposals in group B have at least the following problem:
d) AS knows the address of HSS.

This is a severe problem when the AS is located in a visited or third party network, because it evidently reveals the number of HSSs.

In short it seems that these proposed solutions are not compliant with the network topology hiding principle. In addition utilizing SLF evidently increases the complexity of the proposed solutions: SLF address cannot be sent to foreign ASs, because it opens an access to user profiles of all subscribers.

An acceptable solution should preferably fulfil one or more of the following requirements:
1. Be compliant with the network topology hiding principle.
2. Be as compliant as possible with SIP.
3. Be scalable.
4. Be economical; i.e. need as little signalling effort as possible.
5. Be complete enough, i.e. not to leave many unspecified issues.

Aspects of the present invention are set out in the appendent claims.

It should be noted that any combination of one, two or three of items a to d in claim 1 is possible and may more specifically be claimed.

In one preferred aspect of the present invention the information on whether subscriber specific information is allowed to be fetched from HSS, and in the event that it is not allowed the subscriber specific information, which a foreign or a third party AS needs in order to be able to offer appropriate services, is passed from the S-CSCF to AS. At registration and/or re-registration and/or during a session the S-CSCF may tell an AS that it can or cannot fetch information from HSS. If the AS cannot fetch the information directly from HSS, S-CSCF passes the needed information to the AS.

The information can suitably be passed from S-CSCF to AS in one or more headers of one or more messages and/or in the payload of one or more messages and/,or in one or more special messages and/or the like.

In one specific example, the information can be passed in the payload of the REGISTER message if it is sent to AS or in the payload of the NOTIFY message if it is sent to AS.

Conceptually, in some preferred embodiments at the (re-) registration the S-CSCF gives the AS information on whether the AS has the right to contact the HSS and fetch information from the HSS. If the AS is not allowed to fetch the needed information from HSS, the information is passed from the S-CSCF to the AS in order to avoid giving third party and visited ASs right to fetch that information directly from the HSS.

It should be noted that implementations along these lines can fulfil requirements 1-5 listed above.

Preferably the AS can reject registration. There may be two levels of rejections: one that only prevents usage of the AS in question, and another that cancels the whole registration process. In the latter case the S-CSCF can decide whether to cancel the registration or not. An example of the first type of ASs might be a video server, and an example of the second type might be an AS that controls subscriber's prepaid account.

Conveniently, network topology hiding in accordance with existing methods is compatible with preferred implementations of the present invention. Because hiding is needed only between S-CSCFs and foreign ASs, it is analogous to the hiding between S-CSCFs and P-CSCFs. Thus THIG functionality can be utilized as it is.

Use of the SLF suitably has no influence on preferred implementations of the present invention.

In order that the AS receives the correct address it is preferred that the AS in the own and in a foreign network can be handled differently. As an option an own AS may receive service profile or part of it and/or other necessary information in the registration message similarly as a foreign AS does. If an AS doesn't need any additional information, no access from the AS to get additional information is needed.

In detail, one embodiment of the present invention for the handling of IP multimedia registration can be specified as follows.

The FIG. 1 describes the main functionality of S-CSCF, HSS and AS at registration.

Steps 1-4 indicated in the FIGURE are part of the normal registration procedure. Note that in step 3 the service profile of the registered public user identity is downloaded containing the address list of ASs.

Step 5. If there is at least one item in the address list of ASs, S-CSCF takes the first item from the list. If the AS is located in the same network, S-CSCF sends a third-party REGISTER request to the AS to register the UE. S-CSCF also includes an address in the request where subscriber related service information can be downloaded.

Step 6. AS fetches the service profile and/or other necessary information of the public user identity to be registered.

Step 7. In the case of successful third-party registration AS sends a 200 OK response to S-CSCF.

Step 8. If there is at least one more item in the address list of ASs, S-CSCF takes the next item from the list. If the AS is located outside the S-CSCF's network, S-CSCF sends a third-party REGISTER request to the AS to register the UE. S-CSCF also includes the service profile and/or other necessary information of the registering public user identity.

Step 9. In the case of successful third-party registration AS sends a 200 OK response to S-CSCF.

Steps 5-7 are repeated for every AS in the list that is located in the same network while steps 8-9 are repeated for every AS in the list located outside the current network.

An individual operator may decide to use the steps 8-9 instead of the steps 5-7 for one or more ASs located in the own network.

S-CSCF may send third-party REGISTER requests in parallel to different ASs, or in series, or a combination of the two.

An AS can reject the third-party registration. Depending on the severity of the rejection, S-CSCF can decide to initiate a network-initiated deregistration or only block the AS until successful re-registration is done.

After the third-party registration procedure has been finished AS may utilize the address received in the REGISTER request as needed.

When NOTIFY request is used instead of REGISTER request, the AS has to subscribe in advance, i.e. before step 5 at the S-CSF in order to receive such notifications. In this embodiment, a SUBSCRIBE request is sent from the AS to the S-CSCF, which technique is well known by a man skilled in the art.

Since not every AS needs or maintains information regarding the status of subscriber registration, the S-CSCF may optionally be configured not to contact the AS before the subscriber actually requests a service provided by the AS.

A system of this type can offer the following advantages:
a) Network configuration hiding is not jeopardised because messages sent between AS and HSS.
b) No need to apply and possibly invent new hiding techniques to hide one or more HSS and SLF.
c) Foreign operators have no access to HSS.
d) Makes it possible to easily handle differently own and foreign ASs (i.e. the own ASs are able to fetch information from HSS while the foreign AS are not).
d) It offers a simple solution.

At registration and/or re-registration and/or during a session the S-CSCF may tell an AS that it can or cannot fetch information from HSS e.g. by sending or not sending an address of HSS. If the AS cannot fetch the information directly from HSS, S-CSCF passes the needed information to the AS.

The AS's name and/or address and/or FQDN and/or domain name and/or IP address and/or other identification and/or the like could be used to decide whether the AS is located inside or outside the operator's own network. The decision can be based on DNS lookup, lookup on a list, table, database or alike configured and/or updated during the configuration or after the configuration.

The information transferred in relation to the access that the UE may have to services may vary widely. It could include service information (or service parameters) and could include part or all of a service profile and/or a service and/or user profile and/or other information that is necessary or important for the AS to offer service(s) to the subscriber.

The list of ASs may be fetched from a subscriber's service profile and/or user profile and/or other subscriber specific database, list, table or the like; none, some or even all of the items in the list of ASs may be fetched from a database, list, table or alike which is not subscriber specific.

An AS outside the operator's own network may receive an address (instead of or even In addition to the service profile). The address is an address of a network entity (network element, functionality in a network element, or alike) that functions as a proxy to hide the operator's own network. This way, the AS outside the operator's own network gets an address to a hiding entity and can contact only that address in order to request and receive the necessary data to offer service(s) to the subscriber.

AS outside the operator's own network may get one or more addresses that can be address(es) to hiding entity(es) and/or address(es) to database(s) . and/or address(es) to server(s) provided for accesses from outside the operator's own network. This kind of hiding entity and/or database and/or server and/or alike may be located and/or protected and/or isolated so that access to it don't jeopardize the network configuration hiding e.g. it can be located on the border or even outside of the operator's own network.

Of course AS outside the operator's network can also utilize all kind of local information and/or configuration information and/or alike and/or information copied to it from subscriber's home network.

When the subscriber is registered via a visited network (i.e. is located outside the home network), AS located in the visited network may get an address of P-CSCF (which handles the subscribers registration in the visited network) to retrieve subscriber specific information from the P-CSCF.

The own network is suitably the operator's own network. Optionally networks of the trusted operators may be deemed to be a part the own network.

In the message to an AS located in the operator's own network one or more addresses can be inserted. They can be used (e.g. to get more information/data/parameters and/or alike) to offer service(s) to the subscriber in question. The address(es) that AS in the operator's own network get, can refer to HSS(s), SLF(s), and/or some other database(s) and/or server(s) and/or configuration information and/or data that can be used to request and/or get service profile and/or other necessary information. For example the addresses could be at least one of an address of the HSS, an address of another network entity where to get more subscriber specific information, an address of a SIP server, an address of another AS, an address of an HTTP server, and an address of the presence server where to get presence information concerning the subscriber.

Corresponding information (fetched from the addresses) may be inserted into the message to an AS located outside the operator's own network.

Address(es) (sent to an AS in the operator's own network) as well as the information (sent to an AS outside the operators' own network) may be sent in one or more messages. Address(es) as well as the information may be sent in the payload or in one or more headers of the message(s).

SIP is only one possible protocol that could be used, and REGISTER and NOTIFY are only two possible methods (i.e. message types) even if SIP is used. Other protocols and/or methods and/or message types could be used.

In relation to step 6, the received address(es) or part of them will normally be utilized. In addition, the AS may fetch information from one or more parameters and/or lists and/or tables and/or databases and/or alike that may be common to several ASs or specific only to the AS in question.

It is also possible that no addresses are conveyed in the message and e.g. preconfigured address(es) may be used in the AS located in the operator's own network. It is also possible that they are mixed i.e. one or more addresses from the message are utilized as well as one or more preconfigured addresses are used.

In one embodiment, the S-CSCF can send (to an S-CSCF) the response for registration request after the registration to ASs is done. Alternatively, in another embodiment the same could be done before registration to ASs is done. In the latter case S-CSCF may start deregistration process or do any other appropriate operation if errors occurs in the registration to ASs. So the difference centres on when the response is sent from S-CSCF (to I-CSCF): before or after registration to ASs. Both cases are valid implementations.

The terms "hiding", "configuration hiding" and "topology hiding" as used herein refer to the same concept.

The applicant draws attention to the fact that the present invention may include any feature or combination of features disclosed herein either implicitly or explicitly or any generalisation thereof, without limitation to the scope of any definitions set out above. Additionally, the methods apparatus, systems and devices disclosed herein may be implemented as a computer program product, i.e., a computer program tangibly embodied in a tangible computer readable medium, e.g., in a machine readable storage device for execution by, or to control the operation of, data processing apparatus, e.g., a programmable processor, a computer, or multiple computers. In view of the foregoing description it will be evident to a person skilled in the art that various modifications may be made within the scope of the invention.

The present description and the following claims should be read together with the content of our co-pending PCT patent application that claims priority from UK patent application number 0108041.5, the contents of which are incorporated herein by reference.

Abbreviations
AS Application Server
CPS Call Processing Server
CSCF Call State Control Function
DNS Domain Name System
FQDN Fully Qualified Domain Name
HSS Home Subscriber Server
HTTP Hypertext Transfer Protocol
S-CSCF Interrogating Call State Control Function
IM IP Multimedia
IMS IP Multimedia Subsystem
IP Internet Protocol
NE Network Element
P-CSCF Proxy Call State Control Function
S-CSCF Serving Call State Control Function
SLF Subscription Locator Function
THIG Topology Hiding Inter-network Gateway
UE User Equipment

The invention claimed is:

1. A method, comprising:
participating in a registration of at least one subscriber entity with a network, wherein the registration includes receiving, from a subscriber information store associated with the at least one subscriber entity to a connection controller, information indicative of a service profile; and
enabling an access to an application service of an application provider,
wherein the enabling comprises determining whether the application provider is in a trusted network, and in response to determining that the application provider is in the trusted network, transmitting, from the connection controller to the application provider located remotely from the subscriber information store, at least part of the information indicative of the service profile, and in response to determining that the application provider is not in the trusted network, transmitting from the connection controller to the application provider at least one of subscriber-specific information, wherein the at least one subscriber-specific information includes registration information other than the service profile,
wherein at least some of the information, regarding whether subscriber-specific information is allowed to be fetched from the subscriber information store, is transmitted from the connection controller to the application provider via at least one session initiation protocol message, and wherein the subscriber information store comprises a home subscriber server.

2. The method as claimed in claim 1, further comprising:
determining whether the application provider is in the same network as the connection controller by at least one of a name of the application provider and a network address of the application provider.

3. The method as claimed in claim 1, further comprising:
determining application providers to which the at least one subscriber entity has access; and
performing the registering of the application provider with the network to provide services to the at least one subscriber entity for at least one of the application providers.

4. The method as claimed in claim 1, wherein the subscriber specific information related to the service of the application provider is at least partially derived from at least one of a subscriber service profile and a user profile associated with the subscriber entity.

5. The method as claimed in claim 1, wherein the subscriber specific information related to the service of the application provider is at least partially derived from a service profile that is not specific to an individual subscriber.

6. The method as claimed in claim 1, wherein the network is under the control of a single operator.

7. The method as claimed in claim 1, wherein the network is under the control of a plurality of operators operating in a trusting relationship.

8. The method as claimed in claim 1, wherein the session initiation protocol message comprises a register or a subscribe/notify message.

9. The method as claimed in claim 1, wherein the network comprises a third generation telecommunication system.

10. The method as claimed in claim 1, wherein the subscriber entity comprises user equipment.

11. The method as claimed in claim 1, wherein the application provider comprises an application server.

12. The method as claimed in claim 1, wherein the application provider is capable of providing an application service to the subscriber entity.

13. The method as claimed in claim 12, wherein the application service comprises at least one of a multimedia service or call, a session or call forwarding service, a session control service, a messaging service, a presence service, or a group service.

14. The method as claimed in claim 1, wherein the connection controller comprises a serving call state control function.

15. An apparatus, comprising:
   at least one processor; and
   at least one memory including computer program code, the at least one memory and the computer program code configured to, with the at least one processor, cause the apparatus to perform at least the following:
   participate in a registration of at least one subscriber entity with a network, wherein the registration includes receiving, from a subscriber information store associated with the at least one subscriber entity, information indicative of a service profile; and
   enable an access to an application service of an application provider,
   wherein the enabling comprises determining whether the application provider is in a trusted network, and in response to determining that the application provider is in the trusted network, transmitting, from the apparatus to the application provider located remotely from the subscriber information store, at least part of the information indicative of the service profile, and in response to determining that the application provider is not in the trusted network, transmitting from the apparatus to the application provider at least one of subscriber-specific information, wherein the at least one subscriber-specific information includes registration information other than the service profile,
   wherein at least some of the information, regarding whether subscriber-specific information is allowed to be fetched from the subscriber information store, is transmitted from the apparatus to the application provider via at least one session initiation protocol message, and
   wherein the subscriber information store comprises a home subscriber server.

16. The apparatus as claimed in claim 15, wherein the apparatus is configured to determine whether the application provider is in the same network as the apparatus.

17. The apparatus as claimed in claim 16, wherein the determination is performed by at least one of a name of the application provider and a network address of the application provider.

18. The apparatus as claimed in claim 15, wherein the message comprises a register or a subscribe/notify message.

19. A non-transitory computer-readable medium encoded with instructions that, when executed by at least one processor, perform at least the following:
   participate in a registration of at least one subscriber entity with a network, wherein the registration includes receiving, from a subscriber information store associated with the at least one subscriber entity to a connection controller, information indicative of a service profile; and
   enable an access to an application service of an application provider,
   wherein the enabling comprises determining whether the application provider is in a trusted network, and in response to determining that the application provider is in the trusted network, transmitting, from the connection controller to the application provider located remotely from the subscriber information store, at least part of the information indicative of the service profile, and in response to determining that the application provider is not in the trusted network, transmitting from the connection controller to the application provider at least one of subscriber-specific information, wherein the at least one subscriber-specific information includes registration information other than the service profile,
   wherein at least some of the information, regarding whether subscriber-specific information is allowed to be fetched from the subscriber information store, is transmitted from the connection controller to the application provider via at least one session initiation protocol message, and
   wherein the subscriber information store comprises a home subscriber server.

20. The non-transitory computer-readable medium as claimed in claim 19, the process further comprising:
   determine whether the application provider is in the same network as the connection controller by at least one of a name of the application provider and a network address of the application provider.

* * * * *